United States Patent [19]
Moos et al.

[11] Patent Number: 6,144,286
[45] Date of Patent: Nov. 7, 2000

[54] PTCR-RESISTOR

[75] Inventors: Ralf Moos, Friedrichshafen; Marco Fandel, Markdorf; Wolfgang Schaefer, Friedrichshafen, all of Germany

[73] Assignee: Dornier GmbH, Friedrichschafen, Germany

[21] Appl. No.: 09/295,393

[22] Filed: Apr. 21, 1999

[30] Foreign Application Priority Data

Apr. 24, 1998 [DE] Germany ............................ 198 18 375

[51] Int. Cl.[7] ...................................................... H01C 7/10
[52] U.S. Cl. ........................................ 338/22 R; 29/610.1
[58] Field of Search ............................... 338/22 R, 225 D, 338/202, 20; 252/519.1, 519.12, 520.21; 29/610.1

[56] References Cited

U.S. PATENT DOCUMENTS

| | | | |
|---|---|---|---|
| 3,637,532 | 1/1972 | Ramisch et al. | 252/520 |
| 3,811,938 | 5/1974 | Hirose et al. | 117/224 |
| 3,962,146 | 6/1976 | Matsuoka et al. | 252/520 |
| 3,975,307 | 8/1976 | Matsuo et al. | 252/520 |
| 4,101,454 | 7/1978 | Kulwicki et al. | 252/514 |
| 4,110,258 | 8/1978 | Lauder | 252/468 |
| 5,017,534 | 5/1991 | Chaput et al. | 501/134 |
| 5,030,397 | 7/1991 | Bandyopadhyay et al. | 264/63 |
| 5,378,407 | 1/1995 | Chandler et al. | 252/513 |

FOREIGN PATENT DOCUMENTS

| | | |
|---|---|---|
| 27 53 766 A1 | 6/1979 | Germany . |
| 2753766 | 6/1979 | Germany . |
| 01-143201 | 6/1989 | Japan . |
| 81 77 58 | 3/1981 | Russian Federation . |

OTHER PUBLICATIONS

B. Huybrechts et al., "Review: The Positive Temperature Coefficient of Resistivity in Barium Titanate," *Journal of Materials Science*, No. 30, (1995) pp. 2463–2474. No Month.

J. Daniels et al., "The PTC Effect of Barium Titanate," *Philips Technical Review*, vol. 38, 1978/79, No. 3, pp. 73–82. No date.

W. Heywang, "Resistivity Anomaly in Doped Barium Titanate," *Journal of the American Ceramic Society*, vol. 47, No. 10, Oct. 1964, pp. 484–490.

G. H. Jonker et al., "The Influence of Foreign Ions on the Crystal Lattice of Barium Titanate," *Mat. Res. Bull.*, vol. 17, (1982) pp. 345–350. No. month.

B. C. Mutsuddy et al., "Ceramic Injection Molding," *Materials Technology Series*, London (1995).

*Primary Examiner*—Lincoln Donovan
*Assistant Examiner*—Richard K. Lee
*Attorney, Agent, or Firm*—Evenson, McKeown, Edwards & Lenahan, P.L.L.C.

[57] ABSTRACT

A Positive Temperature Coefficient of Resistance resistor includes a ceramic material of the composition $[(Ba_{1-e-x}Sr_xR_e)_{1-a}M_a][(Ti_{1-b-d}N_bQ_d)]_cO_3$, wherein M is a trivalent or quadrivalent element or a mixture of two or several of these elements; N is a quinquevalent or hexavalent element or a mixture of two or several of these elements; Q is a quadrivalent element or a mixture of two or several of these elements; R is a bivalent element or a mixture of two or several of these elements; and $0.5 \leq x \leq 1$, a is 0 or $0.0003 \leq a \leq 0.3$, and b is 0 or $0.0003 \leq b \leq 0.3$, $0.8 \leq c \leq 1.2$, $0 \leq d \leq 0.2$, and $0 \leq e \leq 0.2$.

20 Claims, 5 Drawing Sheets

PTCR-RESISTOR

BACKGROUND AND SUMMARY OF THE INVENTION

This application claims the priority of German Patent Application No. 198 18 375.5, filed Apr. 24, 1998, the disclosure of which is expressly incorporated by reference herein.

The present invention relates to a PTCR resistor. The abbreviation PTCR stands for Positive Temperature Coefficient of Resistance. These are therefore resistors which, at least within a limited temperature interval, have a positive temperature coefficient.

Electric resistors for higher powers are particularly made of metallic alloys. The electric resistance of a cylindrical wire or of a parallelepiped body can be calculated according to the following formula $$R = \rho \cdot \frac{l}{A} \quad (1)$$

wherein the variable $\rho$ signifies the specific resistance or resistivity; l signifies the length of the resistance body; and A signifies its cross-sectional surface. Pure metals have the lowest specific resistance. With a specific resistance of $0.016 \times 10^{-6}$ $\Omega$m, silver is the material with the best electric conductivity at room temperature. Higher specific resistances are found in the case of (1) copper-nickel-manganese alloys (for example, in the case of CONSTATAN, with $\rho=0.5\times10^{-6}$ $\Omega$m or in the case of MANGANIN, with $\rho=0.43\times10^{-6}$ $\Omega$m); or (2) chromium-nickel alloys, about $\rho=1\times10^{-6}$ $\Omega$m.

If resistance components with a power below one watt, as they are typically used in the case of printed circuit boards, are disregarded, low electric resistance values are achieved according to Equation (1) by means of wide, short bodies of a very conductive material. Electric resistors with a high resistance value consist of long, thin wires, which are therefore often manufactured in a wound form, and consist of a poorly conducting material.

Because of the length of the electric resistance wire, such wound resistance components have an inductance L which should not be neglected. This inductance L becomes particularly noticeable when high currents flow through the component. In order not to destroy the wire by heating, large cross-sections A and therefore large wire lengths l are required which lead to a high inductance. Specifically, high currents which flow through such resistance components must often be controlled. Typically, such high currents are timed at a variable pulse duration ratio. If alternating currents are involved, a phase angle control or zero voltage control is used. In these cases, the inductance of the component must be as low as possible in order to avoid induction-caused voltage excesses. Thus, for high-current applications, resistance materials of an appropriately high specific electric resistance are required to ensure that the wire length and therefore the inductance are within reasonable limits for large cross-sectional surfaces.

Simultaneously, a positive temperature coefficient of resistance a is required for many applications, wherein $$\alpha = \frac{1}{R} \cdot \frac{dR}{dT} \quad (2)$$

or, relative to the specific resistance, $$\alpha = \frac{1}{\rho} \cdot \frac{d\rho}{dT} \quad (3)$$

Resistance components with a positive temperature coefficient of resistance increase their resistance value as the component temperature rises. Thus, a certain self-limiting of the heating current occurs. Typical temperature coefficients of metals and metallic alloys are between 0 and $8,000\times10^{-6}$/K.

Higher specific resistances are found in the case of intermetallic alloys of Main Group IV of the Classification of Elements, such as silicon or germanium. However, as a rule, these have a negative temperature coefficient. Although the specific resistance can be changed within wide ranges by doping, a positive temperature coefficient of resistance exists only within a narrowly limited temperature interval (i.e., the so-called range of impurity exhaustion). In addition, silicon technology requires high expenditures. Large shaped bodies which consist of monocrystals and are provided with a doping agent are very expensive and can be produced in only a few simple geometrical shapes.

Figure 1:
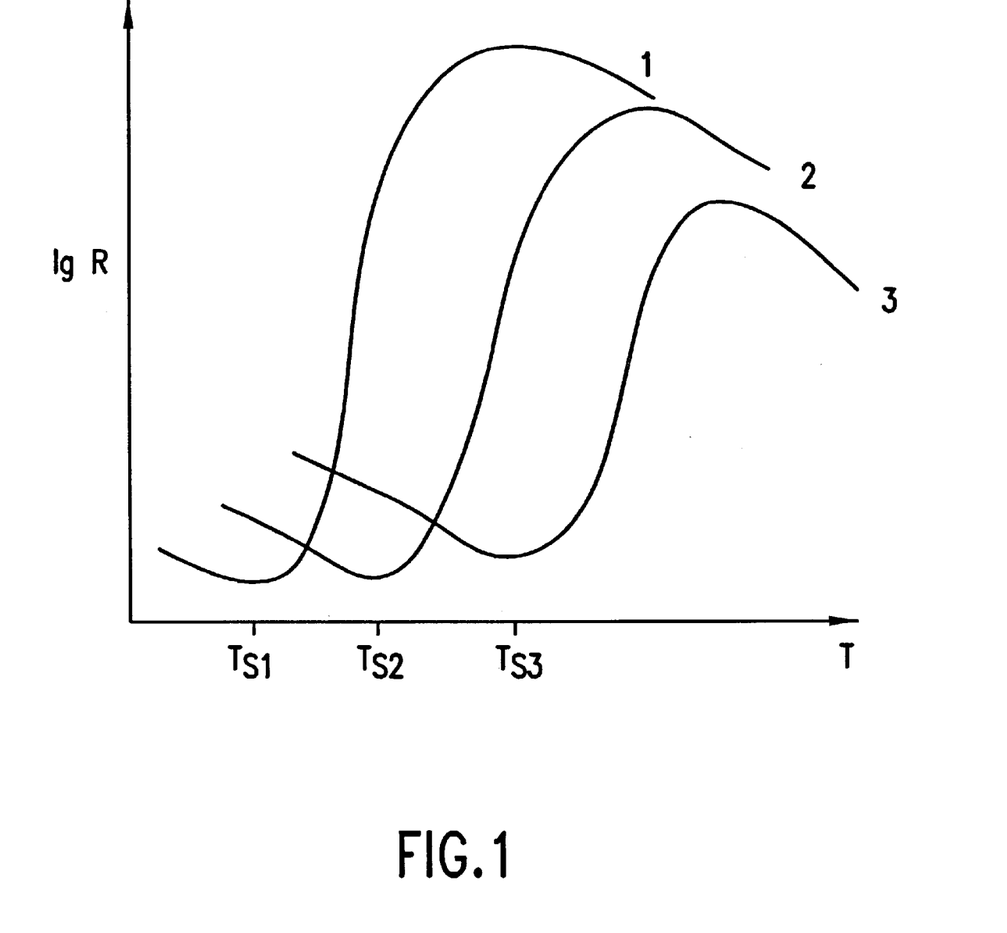
FIG. 1 is a view of the specific resistance of three known PTCR ceramics.

In contrast, ceramics can be produced at significantly lower cost and in almost any geometrical shape. Mainly special PTCR ceramics are used in electrical engineering. At a defined temperature $T_s$, PTCR ceramics have an abrupt rise of the electric resistance, as schematically illustrated in FIG. 1. Such ceramics can be used, for example, as a completely self-regulating component in the form of (1) a heating resistor in hot air fans, heaters and similar devices; (2) a current-limiting element for degaussing coils of picture tubes; or (3) a temperature sensor with an on-off characteristic. As an example, FIG. 1 shows the electric resistance as a function of the temperature of three different component parts. A typical transition temperature $T_s$, at which the temperature coefficient a may assume values of up to 100%/K, is characteristic of each component part.

This so-called ceramic PTCR effect is attributable to the phenomenon that above a defined temperature, the grain boundaries of the ceramic material become so highly resistive that they determine the overall resistance of the ceramic material and thus of the component part. In this case, the whole electric power falls on the thin highly resistive grain boundary layer of the ceramic material, which may lead to considerable thermal tensions and to the destruction of the component part particularly when large currents are switched.

The materials used for such PTCR ceramics are barium titanate ceramics ($BaTiO_3$) which are made electrically conductive with donor dopings in the per mil range. (See Russian patent document SU 81 77 58 B; Japanese patent document JP 01 14 3201 A.) Slight acceptor dopings, which are allocated to the grain boundaries, further increase the temperature coefficient (German Patent Document DE 27 53 766 A1). The extremely steep rise of the resistance takes place approximately at the Curie temperature of the material.

At the Curie temperature, the lattice changes from the ferro-electric phase to the para-electric phase. The transition temperature $T_s$ is therefore virtually identical with the Curie temperature and is therefore a true characteristic of the material. Curve 2 in FIG. 1 describes the temperature variation of the electric resistance of the material $BaTiO_3$. By replacing the barium (Ba) with strontium (Sr), the Curie temperature and thus also $T_s$ changes toward lower temperatures (curve 1 in FIG. 1). A change of $T_s$ toward higher temperatures is achieved by means of lead (Pb) as a barium substitute (curve 3 in FIG. 1). This PTCR effect is discussed in detail, for example, in (1) Huybrechts B. et al., *Review: The Positive Temperature Coefficient of Resistivity in Barium Titanate*, J. Mat. Sci., 30, 2463–74 (1995); (2) Daniels J. et al., *The PTC Effect of Barium Titanate*, Phil. Tech. Rev., 38, 73–82 (1978); and (3) Heywang, W., *Resistivity Anomaly in Doped Barium Titanate*, J. Am. Cer. Soc. 47 (10) 484–489.

Negative temperature coefficient of resistance (NTCR) behavior ($\alpha<0$) exists above and below the very narrow PTCR range, which is not tolerable for all applications. The large temperature coefficient of the resistance of up to 100%/K is also intolerable for some applications. The danger of destruction by thermally induced mechanical tensions during the shifting of large currents, a disadvantage which is decisive for some applications, results from the fact that the whole electric power falls at the grain boundaries and cannot be avoided.

It is therefore an object of the present invention to provide a PTCR resistor by means of which the above-mentioned disadvantages of the state of the art can be avoided.

This object is achieved by a para-electric PTCR resistor according to the present invention having the following composition:

$$[(Ba_{1-e-x}Sr_xR_e)_{1-a}M_a][(Ti_{1-b-d}N_bQ_d)]_cO_3,$$

wherein M is a trivalent or quadrivalent element or a mixture of two or several of these elements; N is a quintavalent or hexavalent element or a mixture of two or several of these elements; Q is a quadrivalent element or a mixture of two or several of these elements; R is a bivalent element or a mixture of two or several of these elements; and $0.5 \leq x \leq 1$, particularly $0.6 \leq x \leq 1$, $a=0$ or $0.0003 \leq a \leq 0.3$, $b=0$ or $0.0003 \leq b \leq 0.3$, $0.8 \leq c \leq 1.2$, $0 \leq d \leq 0.2$, $0 \leq e \leq 0.2$, wherein if a is 0, then b cannot be zero.

This ceramic material for temperature-dependent resistance components based on doped titanates has a continuous positive temperature coefficient of resistance in the temperature range from $-50°$ C. to $250°$ C. In this case, values of up to $9,500 \times 10^{-6}/K$ are reached at room temperature. The specific resistance at room temperature can easily be adjusted between approximately $10^{-6}$ $\Omega m$ and approximately $3 \times 10^{-1}$ $\Omega m$. The Curie temperature of the material according to the present invention is far below the above-mentioned temperature range of $-50°$ C. to $250°$ C. The specific resistance is therefore composed only of the volume resistance, so that the total electric power falls in the grain volume and not at the grain boundaries. As a result, a homogeneous temperature distribution and therefore a good stressing capacity of resistors with respect to power are provided.

An example of a composition of a ceramic titanate material according to the present invention is as follows:

(4)

wherein Ba, Sr, Ti and O are the chemical elements barium, strontium, titanium and oxygen; M is a lanthanide (Atomic Numbers 57 to 71 in the Classification of Elements) or yttrium (Y), indium (In) or thallium (Tl) or a mixture of two or several of these elements. Since the element M is trivalent or quadrivalent and replaces a bivalent element (barium or strontium), it may physically be considered a donor. N is a quintavalent or hexavalent element which can be a substitute for titanium, for example, phosphorus (P), vanadium (V), chromium (Cr), manganese (Mn), arsenic (As), niobium (Nb), antimony (Sb), tantalum (Ta), molybdenum (Mo), tellurium (Te) or tungsten (W) or a mixture of two or several of these elements. Since the element N is quintavalent or hexavalent and replaces a quadrivalent element (titanium), it can physically also be considered a donor. The variables a and b indicate the donor content.

This compound is usually present in a perovskite structure (so-called $ABO_3$-structure). In order to control the sintering activity, the A/B ratio can be varied as shown in Jonker and Havinga, *The Influences of Foreign Ions on the Crystal Lattice of Barium Titanate*, Mat. Res. Bul. 9, 147–156 (1974). The following applies in the above-mentioned example: $A=(Ba_{1-x}Sr_x)_{1-a}M_a$ and $B=Ti_{1-b}N_b$. The parameter c in Equation 4 characterizes the A/B ratio. In the special case when $c=1$, a second-phase-free cubic perovskite structure is present.

A portion of the quadrivalent titanium element positioned in the B-position may also be substituted by other quadrivalent metal cations, such as zirconium (Zr), tin (Sn) or similar cations, without any basic changes of the electric characteristics of the material according to the present invention. An analogous situation applies to the substitution of a portion of the bivalent barium (Ba) or strontium (Sr) by other bivalent metal cations, such as calcium (Ca), magnesium (Mg) or lead (Pb)

According to the present invention, the strontium portion with $0.5 \leq x \leq 1$ in Equation 4 is selected such that, at application temperatures around room temperature, which are typical for electric components, the ceramic titanium material is always in the para-electric condition far above Curie temperature. A grain boundary phenomena which leads to a resistance anomaly, as described in the case of the typical PTCR effect, does not occur.

Other objects, advantages and novel features of the present invention will become apparent from the following detailed description of the invention when considered in conjunction with the accompanying drawings.

DETAILED DESCRIPTION OF THE DRAWINGS
Production of Powder

The production of a resistor is described here using the example of . Corresponding to Equation 4, $x=0.8$, $b=0$, $c=1.01$, and M is the trivalent element lanthanum (La).

$SrCO_3$, $BaCO_3$, $La_2O_3$ and $TiO_2$ are weighed such that the desired stoichiometric ratio is achieved. Because $La_2O_3$ is hygroscopic, it should be previously annealed at approximately 850° C. and then subsequently weighed hot. A typical preparation, together with a grinding medium which may be a solvent, such as cyclohexane, acetone or isopropanol, is then filled into a grinding beaker; is mixed with grinding balls of an appropriate diameter and in an appropriate number; and is mixed for one to four hours in a ball mill. The now intimately mixed, ground material is dried, separated from the grinding balls, filled into an aluminum oxide crucible, and baked for several hours in a furnace at a suitable temperature. The powder will then have the desired composition of material. This can be proven, for example, by means of x-ray diffractometry. The thus obtained powder must be pulverized further by means of an additional grinding step so that it is present in a powder grain size distribution suitable for the further manufacturing process. The crushing of the powder may take place in a planetary ball mill, in an attritor grinder or in a ring gap ball mill. The further process steps can then take place by means of the dried powder from which the grinding balls were removed.

Production of a Simple Resistance Component

From the starting materials produced according to the above example, resistance components can be produced as follows. The powder is charged into an appropriate mold and pressed. If required, an appropriate binder can be admixed to the powder beforehand. If a binder was admixed, it must first be expelled in an oxygen-containing atmosphere at temperatures of up to 400° C. However, a molded body can also be produced in very complex geometrical shapes by means of a ceramic injection molding technique. For this purpose, a suitable, commercially available (for example, thermoplastic) binder is admixed to the powder. After the mixing of the powder and the binder in a shearing roller extruder or in a sigma kneader, granules are obtained which are also called feedstock and which can be injection molded. The injection-molded green compact is then freed of the binder by a slow heating in an oxidizing atmosphere to, for example, maximally 500° C. A detailed description of the ceramic injection molding technique is found in Mutsuddy and Ford, *Ceramic Injection Molding*, London (1995). Irrespective of the forming process, the molded body is then sintered at temperatures of between 1,200° C. and 1,650° C. for several hours in a suitable reducing, but definitely not oxidizing, atmosphere to form a sintered body.

Figure 2:
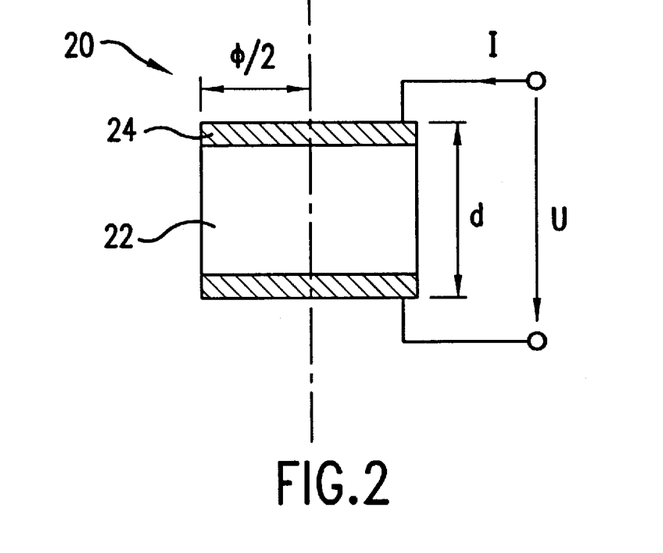
FIG. 2 is a view of the embodiment of a resistance component comprising a material according to the present invention.

FIG. 2 outlines a resistance component 20. The sintered body 22 made of the material according to the present invention can be made into any geometrical shape but is to be introduced here as an example as having a cylindrical shape with a diameter $\Phi$ and of a component thickness d. The front surfaces of the sintered body must also be provided with a metallization layer 24 used as an electric contact. In this case, it should be taken into account that the electric electrode resistor, which is composed of the resistance of the metallization and the transition resistance between the metallization and the ceramic material, must be negligibly small with respect to the overall resistance of the sintered body calculated according to Equation 1. This condition is very important because otherwise a considerable amount of the electrical power will fall off on the thin metallization coating which, when the component is loaded by the current, can lead to destruction because of thermal tensions.

Figure 3:
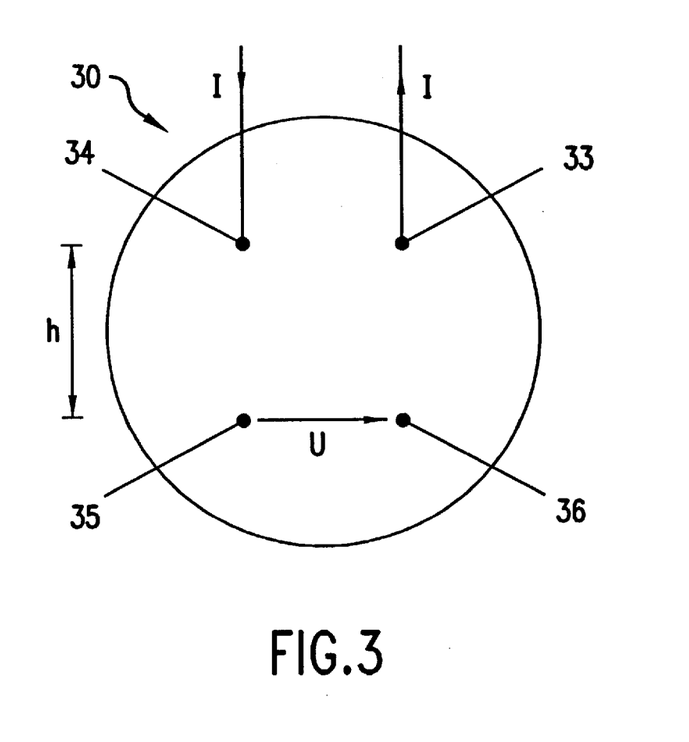
FIG. 3 is a view of an arrangement for determining the specific resistance of a resistor according to the present invention following DIN 50431.

In order to determine the specific resistance $\rho$ of the material and thus the resistance of the sintered body, a construction according to DIN 50431, as outlined in FIG. 3, can be used. In this construction, the not yet metallized sintered body 30 is contacted by means of four contact springs 33–36. The contact springs are arranged in a square arrangement at a distance h, with h<<$\Phi$ being required. A current I is impressed in two of the four contact pins, and the voltage U is measured on the other two pins. From U, I, h and the geometrical data, the specific resistance $\rho$ can be measured. From the difference between (1) the resistance of the metallized sintered body (according to FIG. 2) calculated from the quotient of the voltage and the current; and (2) the resistance of the non-metallized sintered body calculated according to Equation 1 by means of geometrical data, the electrode resistance can be determined.

Electric Measuring of a Resistance

The measuring arrangement according to FIG. 3 can also be constructed to be heated, and the specific resistance can then be measured over the temperature. The course of the specific electric resistance of sintered bodies which were produced as described above is outlined in FIG. 4. As a function of the doping, the course illustrated in curves 1 to 4 could be adjusted. Curve 1 indicates the smallest possible achievable specific resistance; curve 4 indicates the largest possible achievable specific resistance. The variation of the specific resistance can take place by way of the adjustment of the donor content a and/or b. Curve 4 in FIG. 4 applies to either a=0.0003 or b=0.0003; curve 3 applies to either a=0.003 or b=0.003; curve 2 applies to either a=0.03 or b=0.03, and curve 1 applies to either a=0.3 or b=0.3. However, not all above-mentioned dopants are solvable in this amount in titanates.

Figure 4:
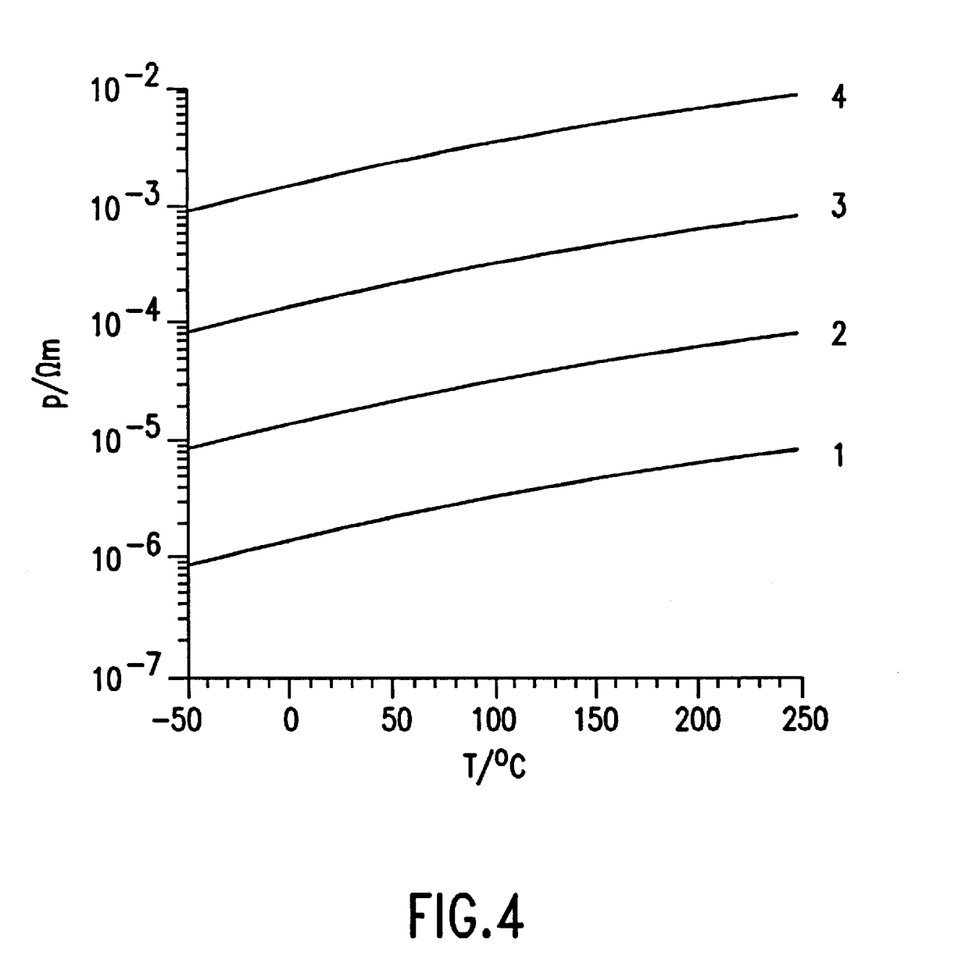
FIG. 4 is a view of the specific resistance as a function of temperature of various resistors according to the present invention.

Larger specific resistances than in curve 4 could not be produced without additional process steps or could not be produced in a reproducible manner. Sintered bodies which were mixed with donors to such a low degree proved themselves as electric insulators and exhibited a strongly thermally activated resistance behavior. Surprisingly, a lower limit below which no more resistances can be produced according to the above-described process seems to exist for the donor content. Lower specific resistances than in curve 1 could also only be produced in a non-reproducible manner.

Figure 5:
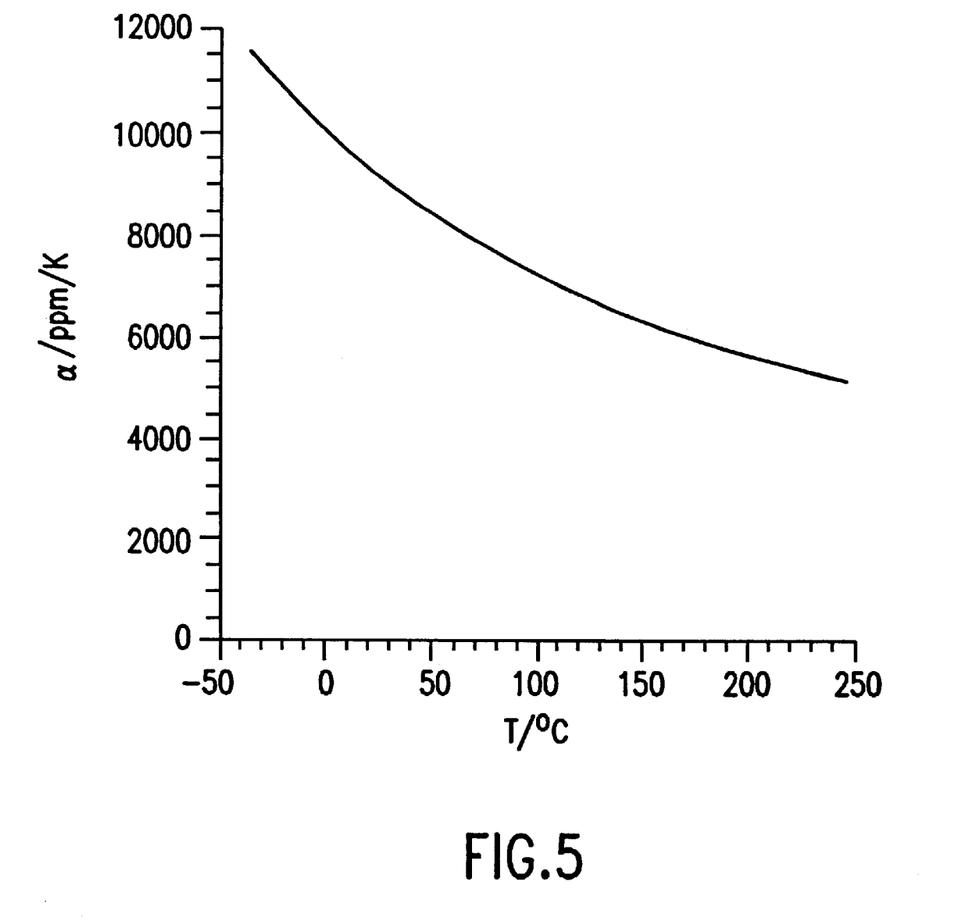
FIG. 5 is a view of the temperature coefficient of resistance of FIG. 4.

The temperature coefficient of electric resistance calculated in FIG. 4 by means of Equation 3 is listed in FIG. 5 against the temperature. In this case, it is noticeable that the temperature coefficient of electric resistance is independent of the donor content. The temperature coefficient of resistance is not constant with the temperature and, at approximately room temperature, assumes values of about $9,500 \times 10^{-6}/K$. Even at 200° C., the temperature coefficient of resistance is higher than $5,000 \times 10^{-6}/K$.

Further Increase of the Specific Electric Resistance

There are two possibilities, which can also be combined with one another, of further increasing the specific electric resistance of the material. First, the specific electric resistance can be further increased by the admixing of an inert, electrically insulating ceramic powder (such as modified zirconium oxide or modified magnesium oxide). Under the selected reduced sintering conditions, a suitable powder should not change its electrical behaviour. In particular, it must not become electrically conductive. The coefficient of thermal expansion should be adapted as well as possible to the ceramic titanate material in order to avoid a mechanical prestressing of the component. Second, a suitable pore forming material (such as a metal-ion-free organic compound or carbon) may be admixed to the ceramic powder. In this case, the type of pores, their distribution and the porosity of the ceramics determine the degree of the resistance increase. In order to ensure sufficient stability, the porosity should not exceed 40% by volume. Both possibilities of increasing the resistance are distinguished by the fact that the temperature coefficient of the electric resistance of the basis material is maintained.

Figure 6:
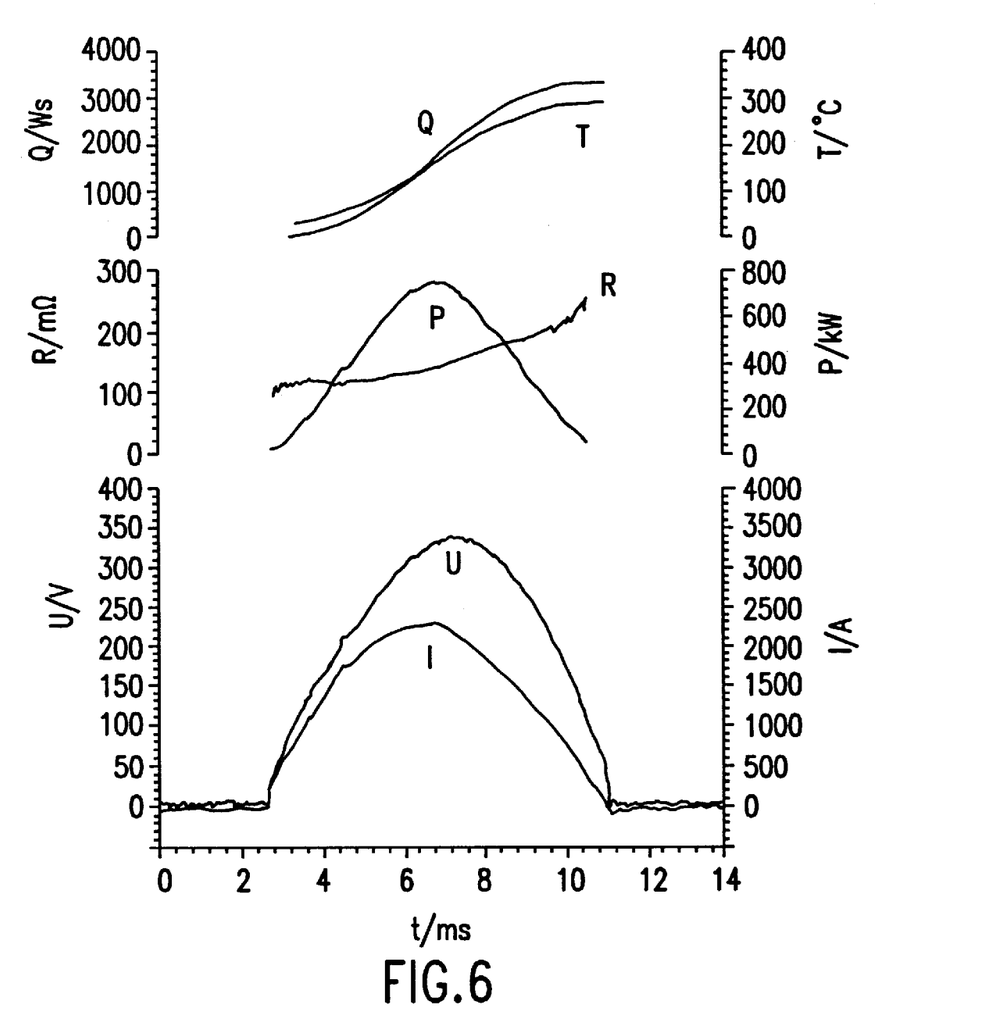
FIG. 6 is a view of an electric high-load resistor for transient current surges comprising a resistance component according to FIG. 2.

Pulsed Current Load on a Resistance Component Produced according to the Invention FIG. 6 shows the test certificate of a pulsed current measurement for 10 ms on a resistance component produced according to above-mentioned examples. The measured component weighed approximately 25 g and had a pellet-type shape of a diameter of approximately 35 mm and a thickness of approximately 6 mm. The specific electric resistance at room temperature amounted to approximately $3\times10^{-2}$ $\Omega$m. At room temperature, the component had a resistance of approximately 120 m$\Omega$. The construction and arrangement corresponded to FIG. 2.

FIG. 6 shows the voltage U over the component as a sine half wave; the current I through the component resulting therefrom; the resistance R calculated from the quotient of the voltage and the current; and the power P which was calculated from the product of the voltage and the current. Also shown is the energy Q which is calculated from the integral of the power over the time and is converted to heat, and the average component temperature T calculated according to Equations 5 and 6 from the energy, while neglecting radiation and heat conduction losses:

$$Q = c_s \times m \times \Delta T \qquad (5)$$

$$T = \Delta T + T_{room} \qquad (6)$$

wherein $c_s$ is the specific heat capacity; m is the component mass; and $T_{room}$ is the room temperature.

Because of the high power falling over the resistance component and the generated temperature rise, the resistance of the component increases and the current reaches its maximum even before the voltage maximum is applied. Despite the maximum power of 800 kW, which falls maximally over the component of approximately 5.7 cm$^3$, and which corresponds to a power density of 0.14 MW/cm$^3$, the component is not destroyed. After an appropriate cooling phase, the original resistance value will recur at room temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A positive temperature coefficient of resistance resistor, comprising:

a para-electric ceramic material of the composition wherein

M is a trivalent or quadrivalent element or a mixture of two or several of these elements, N is a quintavalent or hexavalent element or a mixture of two or several of these elements, Q is a quadrivalent element or a mixture of two or several of these elements, R is a bivalent element or a mixture of two or several of these elements, and $0.6 \leq x \leq 1$,
$a=0$ or $0.0003 \leq a \leq 0.3$,
$b=0$ or $0.0003 \leq b \leq 0.3$,
$0.8 \leq c \leq 1.2$,
$0 \leq d \leq 0.2$,
$0 \leq e \leq 0.2$, wherein if a is 0, b is not 0.

2. A positive temperature coefficient of resistance resistor according to claim 1, wherein a temperature coefficient of the resistor in a range from $-50°$ C. to $250°$ C. is continuously positive.

3. A positive temperature coefficient of resistance resistor according to claim 1, wherein a specific electric resistance at room temperature is from $10^{-6}$ $\Omega$m to $3\times10^{-1}$ $\Omega$m.

4. A positive temperature coefficient of resistance resistor according to claim 2, wherein the Curie temperature of the ceramic material is below $-50°$ C.

5. A positive temperature coefficient of resistance resistor according to claim 1, wherein M is a lanthanide.

6. A positive temperature coefficient of resistance resistor according to claim 1, wherein M is an element selected from the group consisting of Y, In, Tl and a mixture of at least two of these elements.

7. A positive temperature coefficient of resistance resistor according to claim 1, wherein N is an element selected from the group consisting of P, V, Cr, Mn, As, Nb, Sb, Ta, Mo, Te, W and a mixture of at least two of these elements.

8. A positive temperature coefficient of resistance resistor according to claim 1, wherein R is an element selected from the group consisting of Ca, Mg, Zn, Cd, Hg, Pb and a mixture of at least two of these elements.

9. A positive temperature coefficient of resistance resistor according to one of claim 1, wherein Q is an element selected from the group consisting of Zr, Sn, Ce, Si, Ge, Hf and a mixture of at least two of these elements.

10. A positive temperature coefficient of resistance resistor according to claim 1, further comprising a pore forming material having a porosity greater than 0% and up to 40%, thereby increasing the resistance of the resistor.

11. A positive temperature coefficient of resistance resistor according to claim 1, further comprising an electrically insulating material, thereby increasing the resistance of the resistor.

12. A positive temperature coefficient of resistance resistor according to claim 1 having a power of 150 kW/cm$^3$ after loading in a volume-specific manner for at least 10 ms.

13. A positive temperature coefficient of resistance resistor according claim 1, further comprising at least one electric contact element comprising a metal or a conductive ceramic material.

14. A positive temperature coefficient of resistance resistor according to claim 13, wherein the at least one electric contact element is a layer having a thickness of less than 2 mm.

15. A heating resistor comprising a positive temperature coefficient of resistance resistor according to claim 1.

16. A current-limiting element in an electric circuit comprising a positive temperature coefficient of resistance resistor according to claim 1.

17. A current-limiting element according to claim 16, wherein said element is one of a current limiting circuit and an overload protection circuit.

18. A positive temperature coefficient of resistance resistor according to claim 1, wherein M and N are donors.

19. A method of producing the positive temperature coefficient of resistance resistor, comprising:

preparing a ceramic powder;

pressing the ceramic powder to form a molded body; and sintering the moldered body in a reducing atmosphere, wherein said ceramic powder is a para-electric ceramic material of the composition $$[(Ba_{1-e-x}Sr_xR_e)_{1-a}M_a][(Ti_{1-b-d}N_bQ_d)]_cO_3,$$

wherein

M is a trivalent or quadrivalent element or a mixture of two or several of these elements, N is a quintavalent or hexavalent element or a mixture of two or several of these elements, Q is a quadrivalent element or a mixture of two or several of these elements, R is a bivalent element or a mixture of two or several of these elements, and $0.6 \leq x \leq 1$, $a=0$ or $0.0003 \leq a \leq 0.3$, $b=0$ or $0.0003 \leq b \leq 0.3$, $0.8 \leq c \leq 1.2$, $0 \leq d \leq 0.2$, $0 \leq e \leq 0.2$, wherein if a is 0, b is not 0.

20. A method of preparing a positive temperature coefficient of resistance resistor according to claim 19, wherein the pressing is by ceramic injection molding.

* * * * *